March 5, 1957   W. E. GREENAWALT   2,784,082
ORE SMELTING PROCESSES
Filed Jan. 5, 1954
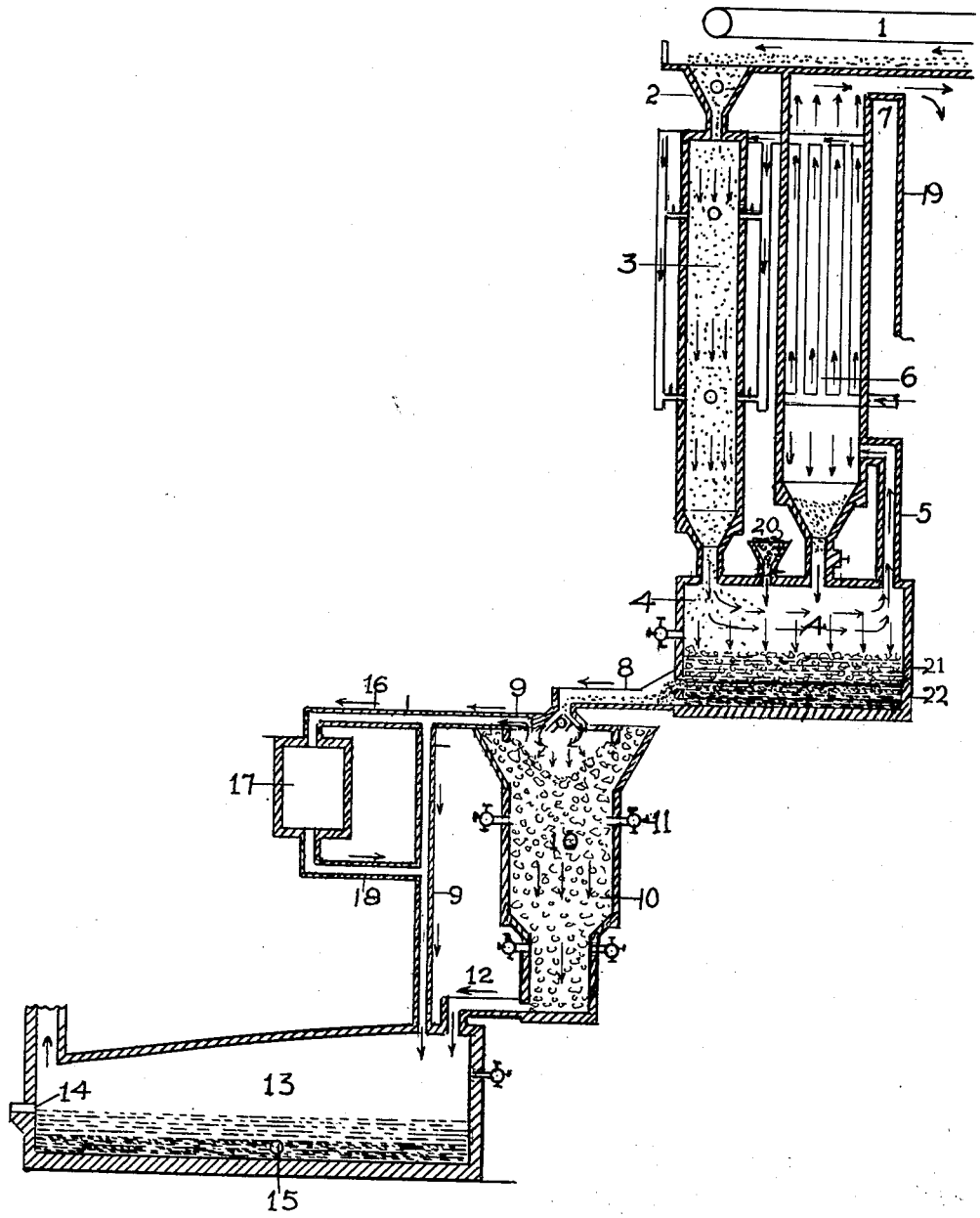
INVENTOR.
William E. Greenawalt

United States Patent Office 2,784,082
Patented Mar. 5, 1957

2,784,082

ORE SMELTING PROCESSES

William E. Greenawalt, Denver, Colo.

Application January 5, 1954, Serial No. 402,321

6 Claims. (Cl. 75—74)

My invention relates in general to smelting finely divided ore. It will be described more particularly to the smelting of finely divided flotation concentrate obtained from milling complex ore, containing copper and other metals.

Complex ores, as mined, or as a mixed product of simple ores, usually contain copper, gold, silver, lead, zinc, and frequently arsenic, antimony, and the rarer metals, associated with sulphur. Unoxidized gold ores are practically always associated with simple pyrite and frequently with chalcopyrite. When they so occur and mixed with copper, they may be considered the same as a natural complex.

If a simple pyritic gold ore, assaying $10.00 a ton in gold, is milled to produce a pyritic gold concentrate assaying $100.00 per ton and containing about 50 percent pyrite and 50 percent silica, the weight of three ounces of gold in a ton of concentrate is negligible as compared with the worthless gangue for handling and shipping. The expense resides in the worthless gangue.

If the concentrate, assaying $100.00 per ton in gold, is smelted with an ore containing two percent copper to produce a 40 percent copper matte—in a ratio of 20 into 1—the gold would be concentrated in the same proportion, and the matte would contain 800 pounds of copper and assay $2000.00 in gold per ton of matte. The cost of handling and shipping about 57 ounces of gold in a ton of 40 percent copper matte would be negligible. Simple gold and silver ores smelted in a regular copper smelting plant would not add much to the cost of smelting. The sulphur in the pyrite would provide most of the heat for fusion.

It is desirable, as a preliminary step in copper matte smelting of complex ore, to eliminate most of the zinc and lead. Both are injurious in large amounts, particularly the zinc. In doing this the ore, as mined, may be milled to produce a bulk concentrate and a lean tailing, to separate all of the valuable minerals from the worthless gangue. The bulk concentrate would then be treated to produce a high grade lead concentrate and a high grade zinc concentrate, both of which could be shipped to the best advantage. The residual concentrate, relatively large in amount, containing practically all of the copper, gold, and silver, and small amounts of lead and zinc and other metals in the original ore, is then smelted to recover any or all of the desired metals as profitable products.

The process will now be described as pertaining to complex sulphide ores containing any or all of the desired metals, occurring either naturally or as an artificial mixture of any or all of them, having as its end product copper matte containing practically all of the gold and silver in the residual copper concentrate.

Referring to the accompanying drawing: The finely divided sulphide ore, ordinarily the bulk concentrate with most of the lead and zinc eliminated, and usually wet, is fed to the drier 1 in a regulated stream, and is delivered into the hopper 2 at a conveniently high temperature of about 300 deg. F., at which temperature sulphur begins to volatilize. It is then showered from the hopper 2 in a regulated stream through the highly heated oxidizing atmosphere of the melting furnace 3 to oxidize the sulphides and melt the ore.

The molten ore, mixed with the melting furnace gas, flows in a continuous stream into the enclosed chamber 4 where the molten ore is separated from the melting furnace gas. The melting furnace gas is withdrawn from the separating chamber 4, through the flue 5, into a heat exchanger 6 to heat fresh air for the melting furnace and general use in the process, to remove some of the dust, and to reduce the temperature of the gas, after which it is passed, through the flue 8 into the dust chamber 19 to settle the dust and to dry and heat fresh ore with the residual heat in the melting furnace gas.

The molten ore, separated from the melting furnace gas, is flowed, through the launder 8 into and through a highly heated column of coke in the reducing furnace 10, heated with air injected into it through the tuyeres 11. Preheated air, from the heat exchanger 6 is used for this purpose. This accomplishes two highly beneficial results. First, the air may be regulated to get any desired temperature and conditions of oxidation or reduction. Second, the molten ore can be quickly and cheaply raised to the best temperature for the separation of matte and slag in the smelting furnace. This separation is also promoted by the relative quiescence of the molten charge, as compared with the turbulent agitation due to charging cold and wet ore periodically into the smelting furnace, as in present practice.

The molten ore, with the volatile elements eliminated in the reducing furnace 10, flows through the launder 12 into the smelting furnace 13, where the molten matte is separated from the molten slag. The slag overflows from the smelting furnace 13 through the outlet 14, and the matte is removed through the tap hole 15.

Zinc is highly injurious in smelting ores containing copper, gold, and silver. If present in considerable amounts it is usually penalized in shipping copper, gold, or silver ores to a custom smelter; and in any case, it is rarely, if ever, paid for. It forms a sluggish slag, and thus causes a high metal loss in the slag, and it has a tendency to form accretions in the smelting furnace which interfere with effective smelting.

Zinc sulphide is readily oxidized in the highly heated oxidizing atmosphere of the melting furnace, much the same as in flash roasting. The oxide is not particularly volatile. Metallic zinc is very volatile at temperatures above 2200 deg. F. The oxide in the molten ore, produced in the melting furnace, on passing through the highly heated reducing atmosphere of a column of coke, is reduced to elemental zinc and volatilized, and passes out of the reducing furnace 10 through the flue 9.

The gas from the reducing furnace 10, relatively small in amount, is very hot and contains considerable carbon monoxide, available for heating purposes. If the amount of volatile matter in the gas is so low as not to warrant special recovery, it is flowed, through the flue 9 direct into the smelting furnace 13 to keep the furnace at an even temperature for the best results in separating the molten metal product from the molten slag. If the reducing furnace gas contains sufficient volatile matter to warrant its special recovery, it is flowed through the flue 16 into the fume precipitator 17, and then through the flues 19 and 9 into the smelting furnace. Elemental zinc on reaching an oxidizing atmosphere is promptly converted into the oxide, and the oxide is recovered in the fume precipitator 17. Lead and other volatile metals act much the same, but not with the same intensity. Zinc oxide freed from injurious iron compounds is easily soluble in sulphuric acid as the sulphate, which may then be electrolyzed to produce zinc of high purity. Lead sulphate is practically insoluble.

If the amount of zinc or other volatile metals is so low as not to warrant passing the molten ore through the reducing furnace 10, similar results may be obtained by maintaining a mass of coke in the separating chamber 4, preferably by maintaining a pool of the ore 22 in the separating chamber, and floating a mass of carbonaceous material 21 on the pool of the molten ore, or partly immersed in it. This can easily be done because the specific gravity of the molten ore is large compared with that of coke, and the mass of coke will always automatically distribute itself evenly as the coke is unevenly consumed. The molten ore, separated from the melting furnace gas in the separating chamber 4 flows through the mass or layer of coke, and the melting furnace gas separated from the molten ore flows into the heat exchanger and dust chamber where the volatile metals are recovered in the usual way. Flowing the molten ore through the highly heated mass of coke to volatilize the volatile elements, will at the same time serve to control the temperature of the molten ore to get the best separation of the molten metal from the molten slag. Maintaining a layer of coke or other solids floating on the molten ore in the separating chamber also momentarily retards the showered ore from entering the molten bath, and thus gives time to permit chemical reactions to go to completion in the gas separating chamber. The molten ore at a high temperature in a quiescent mass in the smelting furnace, freed from highly injurious zinc and other volatile metals, assures a high recovery of the gold.

Silica, in the form of crushed quartz or a high grade silicious gold or silver ore, may be mixed with the coke in the reducing furnace 10 to facilitate the distribution of the molten ore and the hot furnace gas, and at the same time act as a flux in forming slag. By mixing the coke with quartz any degree of reduction or oxidation may be obtained by varying their proportions and regulating the air. Coke and quartz may be charged into the separating chamber from the hopper 20. Fluxes and other reagents may be added as desired anywhere in the process.

I claim:

1. A process of smelting finely divided complex ore containing copper sulphides comprising, showering the ore through the highly heated oxidizing atmosphere of a melting furnace to oxidize the sulphides and melt the ore, flowing the molten ore and the hot melting furnace gas into an enclosed chamber to separate them, withdrawing the hot melting furnace gas from the separating chamber, passing the molten ore separated from the melting furnace gas through a highly heated column of carbonaceous material to remove volatile constituents from the ore, then flowing the ore freed of volatile constituents into a smelting furnace to separate the molten copper matte from the molten ore slag.

2. A process of smelting finely divided complex ore containing copper and other metal sulphides comprising, showering the ore through the highly heated oxidizing descending atmosphere of a melting furnace to oxidize the sulphides and melt the ore withdrawing the mixture of molten ore and melting furnace gas in a combined continuous stream from the melting furnace, separating the molten ore from the hot melting furnace gas, passing the molten ore separated from the hot melting furnace gas through a highly heated column of carbonaceous material to control its temperature and remove volatile constituents from the ore, then completing the smelting to separate the resulting copper matte from the molten ore slag.

3. A process of smelting finely divided ore containing copper sulphides comprising, showering the ore through the highly heated oxidizing atmosphere of a melting furnace to melt it and oxidize the sulphides withdrawing the mixture of molten ore and melting furnace gas in a combined continuous stream from the melting furnace, separating the molten ore from the melting furnace gas, passing the molten ore separated from the hot melting furnace gas through a highly heated mass of carbonaceous material in a reducing furnace to control its temperature and remove volatile constituents from the ore, flowing the molten ore into a smelting furnace to separate the molten matte from the molten slag, and delivering the hot gas from the reducing furnace into the smelting furnace to stabilize the temperature of the molten charge.

4. A process of smelting finely divided ore containing copper sulphides comprising, showering the ore through the highly heated atmosphere of a melting furnace to melt it, flowing the molten ore and the hot melting furnace gas into an enclosed gas separating chamber to separate the molten ore from the hot melting furnace gas, flowing the molten ore separated from the melting furnace gas through a highly heated mass of carbon, then completing the smelting to separate copper matte from the molten ore slag.

5. A process of smelting finely divided ore containing copper sulphides comprising, showering the ore through the highly heated atmosphere of a melting furnace to melt it, flowing the molten ore and the hot melting furnace gas into an enclosed separating chamber to separate the molten ore from the melting furnace gas, then flowing the molten ore separated from the melting furnace gas through a highly heated column of carbon against an ascending current of reacting gas, and continuing the smelting to separate copper matte from the molten ore slag.

6. A process of smelting finely divided ore containing copper sulphides comprising, showering the ore through the highly heated atmosphere of a melting furnace to melt it, withdrawing the mixture of molten ore and melting furnace gas in a continuous stream from the melting furnace, continuously separating the molten ore from the melting furnace gas, then flowing the molten ore separated from the melting furnace gas through a highly heated mass of carbon, and continuing the smelting to separate the resulting copper matte from the molten slag.

References Cited in the file of this patent

UNITED STATES PATENTS

| 538,004 | Williamson | Apr. 23, 1895 |
| 859,572 | McDonald | July 9, 1907 |
| 2,307,459 | Greenawalt | June 5, 1943 |
| 2,735,759 | Greenawalt | Feb. 21, 1956 |